UNITED STATES PATENT OFFICE.

ALBERT E. GREENE, OF CHICAGO, ILLINOIS.

PROCESS OF REFINING FERRO METALS.

1,185,396.   Specification of Letters Patent.   Patented May 30, 1916.

No Drawing.   Application filed December 27, 1912.   Serial No. 738,837.

*To all whom it may concern:*

Be it known that I, ALBERT E. GREENE, citizen of the United States, residing at Chicago, in the county of Cook and State of Illinois, have invented a certain new and useful Improvement in Processes of Refining Ferro Metals, of which the following is a full, clear, concise, and exact description.

My present invention relates to the reduction of ores of metals like iron and to the production of refined metals therefrom.

My present invention is a modification of the open hearth process and involves the use of heat generated by means other than combustion in the furnace chamber and also involves the use of a reducing gas to aid the reduction of the ore. The ordinary reactions involved in that modification of the open hearth process using molten pig iron and iron-ore consist essentially in the reduction of the iron oxids of the ore by means of the carbon contained in the molten pig iron. This same reaction is applied for the production of low-carbon ferro-alloys such as low-carbon ferro-chromium and ferro-manganese. In these old processes of refining ferro-metals there results a loss of metallic oxid in the slag and this is especially the case with the more easily oxidizing alloys like ferro-manganese. In fact, the cost of refining ferro-manganese is so heavy that the commercial production and use of the refined ferro-manganese is very small.

I have found that it is possible to modify the reaction between a high-carbon ferro-metal and an oxid of said metal by supplying the heat electrically and supplying a reducing agent in the form of a reducing gas or vapor to complete the reduction of oxid and to assist in decarburizing the metal. In this way the loss of metallic oxid in the slag is practically nothing. Furthermore, I find that the reaction between a highly heated oxid and metal containing carbon is very greatly aided and increased in time by the use of reducing gas.

The essential feature of my invention consists in the use of a gas which will aid the reduction of the oxids and simultaneously aid in the oxidation of the undesired elements, such as carbon. Such a gas may be obtained from any ordinary producer or furnace like the blast furnace and the variation permissible in the several components of the gas is very large. It is essential, of course, not to use a gas which contains so much hydrocarbon components or tar, or the like, as to carburize the metal. On the other hand, the reducing components may be small without interfering with this reaction. The producer gas might analyze, for example, 25% CO, 4% H and 8% $CO_2$; and an average blast furnace gas might contain 23% CO and 12% to 15% $CO_2$. An important feature of this process is the method of accelerating and completing the reactions, namely the reduction of metallic oxid and the oxidation of carbon contained in the high carbon metal: (1) by the continuous removal of the oxidation products in the reducing gas passed continually through the furnace during the process, and (2) by the reaction of that reducing gas itself to reduce the oxid of the metal and to decarburize the metal, the last mentioned effect resulting particularly from the presence of $CO_2$ in the reducing gas. It is essential, of course, that the equilibrium conditions in the furnace atmosphere (covering the charge) be continually such as to carry to completion the reaction between the oxid and carbon. Herein lies the essential difference between this and an open-hearth process, for although reducing gas passes continually into an open-hearth furnace, yet the equilibrium conditions therein are never such as to cause complete reduction of the oxid slag, since they are the result of combustion of that reducing gas with air entering therewith; and the result is that the steel in an open-hearth furnace requires deoxidation by special alloys or agents at the end of the open-hearth process. My process, therefore, may be used in connection with any ordinary gas producer or blast furnace for the supply of gas.

In one modification of this invention the $CO_2$ or oxidizing component of the reducing gas is preferably maintained as high as allowable without oxidation of the metal, the purpose being to further accelerate the decarburization of the metal by the oxidizing action of the gas as well as by that of the metallic oxids present.

I will now describe one method of operating this process for the production of low-carbon ferro-manganese. In one modification of the process an induction furnace forms a simple means for providing the heat. Ordinary 80% ferro-manganese is melted and charged into this furnace and manganese ore is then charged in amount sufficient to approximately take up the carbon which it is desired to remove. The charge is then heated and reducing gas is blown against the top surface of the metal in contact with the ore. I prefer to increase the heat in the top of the furnace by causing an electric arc to pass between an electrode entering the furnace and the ore charge, and in order to get a better reaction between the gas, the metal and ore, it is desirable to blow the arc by means of the gas into contact with the charge. In this way it is possible to practically completely reduce the manganese-ore and at the same time to eliminate the carbon. More ore may be used, the excess being reduced with gas.

Another feature of my process relates to the manufacture of steel from pig iron containing alloy elements which it is desired to retain. Essentially in the carrying out of this process, the steps are the same as described above for the reduction of carbon in ferro-manganese, but the production of high grade manganese steel will be described. Molten pig iron, preferably low in phosphorous and sulfur and silicon, and containing a suitable amount of manganese, is charged into an electric arc furnace. On top of this metal, iron-ore and some manganese-ore is charged. The amount of oxid in the ore is sufficient to combine with and remove practically all the carbon in the molten metal. The amount of manganese ore is such as will give, when reduced, together with the manganese retained in the metal, the proper amount of manganese in the finished steel, it being assumed that essentially all the manganese is reduced. The charge is then heated with electric heat. Where desired, the ore may be charged first and heated with fuel combustion and the molten metal charged on top of the highly heated ore charge. After starting with the electric heating, reducing gas is blown into the charge, preferably so as to cause an intimate contact of metal ore and gas. The higher the temperature, within reasonable limits, the more easily is the reduction and refining accomplished.

This process possesses the special advantage over the ordinary decarbonizing and refining process, in that it produces a deoxidized metal, saves the base metal and the alloy metal, practically cuts out waste of metal in the slag, as oxid, and produces a metal of highest purity and quality.

An essential feature of my process is the method of carrying to completion the ordinary oxidation reactions which result when oxid ore and carburized metal ore are heated together, and this method consists in the use of a gas which has reducing properties for the oxid. It may also have oxidizing properties for the carbon as, for example, by the $CO_2$.

It is understood that the process is applicable to the reduction and refining of metals in general which have affinities for carbon.

By the term ferro-metal, it is understood that I mean either iron or any alloy of iron, or any metal or alloy having similar properties to iron, in its reaction to carbon.

In the heating of a charge of iron-ore, for example, prior to treatment with a reducing gas and carbonized metal, it is preferable, of course, to employ a basic hearth. The preliminary heating of the ore may be accomplished by producer gas burned in the furnace and subsequently cutting off the supply of air and heating by electric heat. A suitable furnace for this is shown in my Patent #1,031,257. After starting the electric heating, I prefer to force the reducing gas into more intimate contact with the charge than is possible with chimney draft in open hearth furnaces.

What I claim is:

1. The process of decarburizing a charge of high carbon metal or alloy and producing refined low carbon metal, said process consisting in electrically maintaining at an elevated temperature a charge of the carburized metal and a metallic oxid of a metal which is desired reduced therewith, causing the oxygen of said oxid to combine with the carbon of the carburized metal, and meanwhile completing and accelerating this oxidation of carbon and reduction of metallic oxid by continually removing the gaseous oxidation products thereof in a reducing gas continuously forced through the furnace chamber during the process.

2. In the production of refined low carbon metal from a charge of carburized metal and a metallic oxid which is desired reduced therewith, the process which consists in maintaining the charge electrically at an elevated temperature in a furnace substantially free from carburizing action on the metal, and completing and facilitating the oxidation of carbon and reduction of oxid by removing the gaseous oxidation products of the reactions in a current of reducing gas passed continually through the furnace.

3. The process of refining a metal having affinity for carbon and decarburizing the same by the aid of an oxid thereof, which consists in electrically maintaining at an elevated temperature a charge of the carburized metal and oxid thereof in a furnace chamber substantially without carburizing effect on the metal and, while maintaining a reducing atmosphere in the furnace, causing a current of gas having reducing properties toward said metallic oxid to pass continually through the furnace, removing therewith the gaseous oxidation products of the reactions between oxygen and carbon.

4. The process of producing a decarburized metallic alloy from a carburized metal having affinity for carbon and an oxid of another metal which is desired alloyed therewith, said process consisting in electrically maintaining at an elevated temperature a charge of the carburized metal and oxid of said second metal in a furnace substantially free from carburizing effect on the refined product, and meanwhile passing a reducing gas through the furnace chamber so as to continually remove the gaseous oxidation products of reactions between the oxygen and carbon of the charge, thereby completing and facilitating the decarburizing and production of the alloy.

5. The method of reducing an oxid ore of a metal having affinity for carbon direct to decarburized metal, said method consisting in electrically heating a charge of the ore to an elevated temperature in a furnace lined with refractory material substantially free from carburizing effect on the reduced metal, and while heated therein causing molten carburized metal to be heated therewith, whereby the carbon in the metal and the oxygen in the ore react, and meanwhile completing the reduction of the oxid and the reactions between the oxid and the carbon by removing the products of the reactions in a current of reducing gas continually passed through the furnace.

6. The method of producing steel from carburized iron and iron ore, which consists in heating together in an electric furnace a charge of iron ore and molten carburized iron in an atmosphere reducing toward oxid of iron, and during the reaction between the oxygen and carbon continually removing the gaseous oxidation products in a current of reducing gas, said gas completing and facilitating the reduction of oxid and oxidation of carbon.

7. The process of producing low carbon iron alloys from carburized metal and oxid ore containing the metals constituting the alloy, said process consisting in electrically heating a charge of the carburized metal and ore in a reducing atmosphere causing the oxygen of the ore to combine with the carbon of the metal and removing the oxidation products thereof by continually forcing through the furnace a reducing gas.

8. The process of producing a low carbon iron alloy reacting on a high carbon alloy with an oxid containing one or more of the metals constituting the alloy, said process consisting of electrically maintaining the charge at an elevated temperature sufficient to cause the oxygen of the oxid to react with the carbon in the metal and completing and accelerating this reaction by removing the oxidation products continually in a current of reducing gas passed through the furnace while maintaining the atmosphere reducing.

9. The process of producing a low carbon manganese iron alloy which consists in providing a bath of the molten alloy high in carbon and while maintaining this bath heated electrically at an elevated temperature in an electric furnace in a reducing atmosphere, treating it with an oxid containing one or both of the metals iron and manganese in suitable proportions to give when reduced the desired percentages of each metal in the alloy, and continuously removing the $CO_2$ formed by the reactions in a current of reducing gas passed continually through the furnace during the process.

10. The method of completing and accelerating the reaction between a high carbon metal and an oxid of a metal desired reduced thereinto, consisting in heating the metal and oxid to a reacting temperature in an electric furnace in a reducing atmosphere, and causing a current of reducing gas containing a considerable proportion of $CO_2$, removing the products of oxidation of carbon in the metal in this gas.

11. The process of reducing direct an ore of a metal having high affinity for carbon, which consists in first preheating a charge of the ore on the hearth of a furnace in any suitable manner, then charging carburized metal thereon, causing them to react in a reducing atmosphere while maintaining the temperature electrically, and removing the gaseous oxidation products in a current of reducing gas caused to pass through the furnace.

12. The process of making steel from pig iron and ore, which consists in charging pig iron and ore in proportions to use up the oxygen and carbon into an electric furnace, heating the charge up to a reacting temperature by means of electric heat, and, while maintaining a reducing atmosphere, passing reducing gas continually through the furnace and removing therewith the gaseous products of oxidation.

In witness whereof, I hereunto subscribe my name December, A. D. 1912.

ALBERT E. GREENE.

Witnesses:
RUTH C. McDONNELL,
K. WALLACE.